US 6,709,581 B2

(12) United States Patent
Leckal

(10) Patent No.: US 6,709,581 B2
(45) Date of Patent: Mar. 23, 2004

(54) POOL FILTER CLEANER

(76) Inventor: Richard Leckal, 97 Berkley Ct., Wayne, NJ (US) 07470

( * ) Notice: Subject to any disclaimer, the term of this patent is extended or adjusted under 35 U.S.C. 154(b) by 0 days.

(21) Appl. No.: 10/193,775

(22) Filed: Jul. 3, 2002

(65) Prior Publication Data

US 2004/0004035 A1 Jan. 8, 2004

(51) Int. Cl.[7] .............................................. B08B 11/02
(52) U.S. Cl. ....................... 210/169; 210/409; 134/137; 134/166 R; 134/199
(58) Field of Search ................................. 210/169, 407, 210/409, 411, 416.2; 134/137, 138, 151, 152, 166 R, 167 R, 198, 199

(56) References Cited

U.S. PATENT DOCUMENTS

| | | | | | |
|---|---|---|---|---|---|
| 3,421,527 | A | * | 1/1969 | Dettman | 134/138 |
| 3,820,552 | A | * | 6/1974 | Lang et al. | 134/113 |
| 4,417,596 | A | * | 11/1983 | Pahlen | 134/152 |
| 4,668,384 | A | * | 5/1987 | Holman | 210/797 |
| 5,292,074 | A | * | 3/1994 | Clark et al. | 239/546 |
| 5,989,419 | A | * | 11/1999 | Dudley et al. | 210/169 |
| 6,156,213 | A | * | 12/2000 | Dudley et al. | 210/791 |
| 6,463,943 | B1 | * | 10/2002 | Monroe | 134/152 |
| 2002/0011259 | A1 | * | 1/2002 | Pociask | 134/34 |

* cited by examiner

Primary Examiner—Fred G. Prince
(74) Attorney, Agent, or Firm—Donald R. Heiner, Esq.

(57) ABSTRACT

A device for cleaning a swimming pool filter of the flexible tube type and wherein the pool may either be either of the standard backyard type or the larger commercial type pool. The flexible tubes are banded together to form a removable flexible tube nest which is inserted into the pool filter. The cleaning device of the instant invention has an inner tube having a plurality of small apertures formed there through and essentially at one end thereof and circumferentially around the tube. The opposite end of this tube has a plurality of spacers about its circumference to separate it from an outer tube into which it is inserted. An end cap having a female hose connector is disposed over this end of the inner tube. A lever type hose valve is inserted into the hose connector and water supply is connected to the hose valve. The inner tube is then placed over one of the flexible tubes of the nest water will flow downwardly between the inner and outer tubes then through the apertures at the lower end of the inner tube thereby contacting and washing the flexible tube when the user of the device moves the device in an up and down and twisting motion.

5 Claims, 5 Drawing Sheets

POOL FILTER CLEANER

BACKGROUND OF INVENTION

1. Field of the Invention

The present invention relates to a simple device for cleaning the flexible tubes of a flexible tube nest of a swimming pool filter. The entire flexible tube nest is removed from the filter, placed upside down with the flexible tubes facing upward, and the pool filter cleaner of the instant invention is placed over each tube, one by one, the pool filter cleaner, with water flowing through it, is slowly moved up and down the entire length of each tube and with a slight twisting or rotating motion until each tube, individually, is cleaned. After the entire flexible tube nest has been cleaned it is re-inserted into the filter for its intended purpose.

2. Background of the Invention and Description of the Prior Art

A search of the prior art has uncovered the following patents of various types generally in the field of filter cleaning apparatus. One such patent is the patent to Lake, U.S. Pat. No. 4,834,883 having vertically extending filter elements or tubes with closed lower ends. A spray nozzle is moved horizontally into and out of a filter and, in turn, pressurized water is supplied to the nozzle. The nozzle sprays water upwardly impacting the filter tubes thereby cleaning them.

The Chmielewsli patent, U.S. Pat. No. 5,384,045 also relates to the cleaning of a dirty swimming pool filter. In this case however the pool filter is journaled for rotation about a vertical axis and about a vertical array of nozzle. Pressurized water is supplied through a garden hose, enters an inlet connection, and causes the filter to rotate and spray clean. This is clearly distinguishable from the instant invention.

Another type of device shown in the prior art is the annular disk type wherein filters are axially carried on a tubular shaft which rotates. While this patent is of interest from a background standpoint, it is not of the flexible tube type of the instant invention.

The Poe patent, U.S. Pat. No. 4,545,905 and the patent to Morin, U.S. Pat. No. 4,578,186 while they may be of interest from the standpoint of the background of the invention, they also are not of the flexible tube type wherein water, under pressure, flows between two tubes and eventually between apertures and an inner tube, and then impacting a flexible tube filter one by one. When using the instant invention to clean the individual flexible tubes of a flexible tube nest, the nest itself is removed from the filter. The filter is turned upside down, for instance, on a bucket, and the tubes are therefore extending upwardly. The cleaning device which forms the subject matter of this invention is then connected to a water source, such as a garden hose, and a valve connected to the invention in an off position. The device is then inserted over and around one of the flexible tubes of the nest some distance, the water source is turned on, and the valve is placed in the on position. Water flows downwardly through the device to be described and the device is moved up and down the entire length of the flexible tube with a slight twisting motion which then will clean the tube. After each tube is cleaned the water supply is shut off, the device is removed from one flexible tube and placed on another, and so forth, until each flexible tube of the nest is cleaned. The flexible tube nest is then replaced in the filter and the filter replaced on the swimming pool.

SUMMARY OF THE INVENTION

In general, the purpose of the present invention is to provide a unique, inexpensive, and practical device for the cleaning, separately, of each flexible tube of a swimming pool filter of the flexible tube type. Each tube can be cleaned separately and efficiently by the simple movement of the invention in an up and down direction while at the same time the device is being slightly rotated by the user thereof. The device itself is connected to a pressurized water source such as a standard garden hose which is readily available. The device comprises essentially an outer tube and an inner tube. The inner tube, at one end thereof, and extending upwardly some distance, has a plurality of small holes there through and circumferentially spaced around the inner tube. At its other end, the inner tube has a plurality of spacers disposed around its circumference in order to keep it spaced apart from the outer tube when it is inserted into the outer tube. At the end of the inner tube having the small holes there through is a bushing having a lip and wherein the bushing fits flush inside the outer tube thereby, again, keeping the inner and outer tubes spaced apart. This end of the inner tube fits into the bushing and is held in place on the lip.

Inserted in the opposite end, or the other end, of the inner tube is a plug, preferably of rubber, around which the spacers are disposed.

An end cap having a female hose connection is fitted over this end of the outer tube. The female hose connector in turn has inserted in it a flow valve preferably of the lever type.

The pressurized water source, such as a standard garden hose, is then connected to the lever type flow valve.

When it is desired to clean the pool filter of this particular flex tube nest type, the nest is removed from the pool filter, it is turned such that the tubes are facing upward, the water source is connected to the valve of the lever type, with the lever in the off position, the assembled device is slid over one of the tubes to be cleaned, the valve lever is moved to the on position, water flows downwardly between the inner and outer tubes, and near the bottom of the tubes, water flows through the small openings or apertures in the inner tube and the entire device is moved up and down and rotated about the tube to be cleaned thereby scrubbing the individual flexible tube. The device is then moved to the next tube and so forth until the entire nest is cleaned at which time it is replaced into the filter.

Therefore, it is an object of the invention to provide a flexible tube swimming pool filter cleaning device.

It is another object of the invention to provide such pool filter cleaning device having a pair of spaced apart telescoping tubes.

It is a further object of the invention to provide such a tube filter cleaning device wherein one end of an outer tube is fitted with an end cap further having a female hose connection.

It is yet another object of the invention to provide such a flexible tube cleaning device wherein the end cap with female hose connection further has connected to it a lever type hose valve.

These and further objects, features, and advantages of the invention shall become apparent from the following detailed description of a preferred embodiment thereof when taken in conjunction with the drawings wherein like reference characters refer to corresponding parts in the several views.

DETAILED DESCRIPTION OF THE PREFERRED EMBODIMENT

Figure 1:
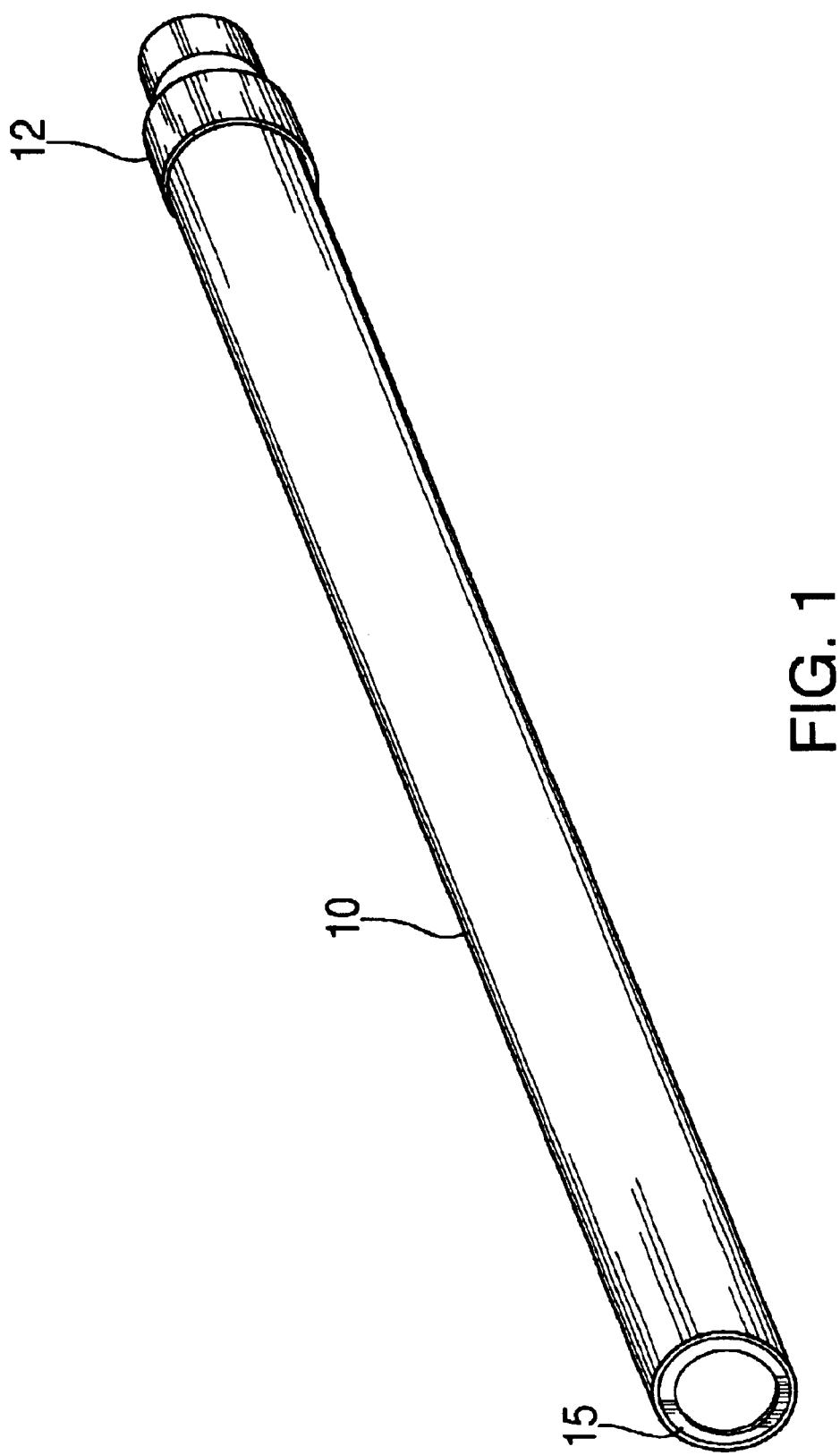
FIG. 1 is a perspective view of the assembled device showing the inner tube inserted into the outer tube, the bushing inserted into the outer tube, and the end cap with female hose connection.
Figure 2:
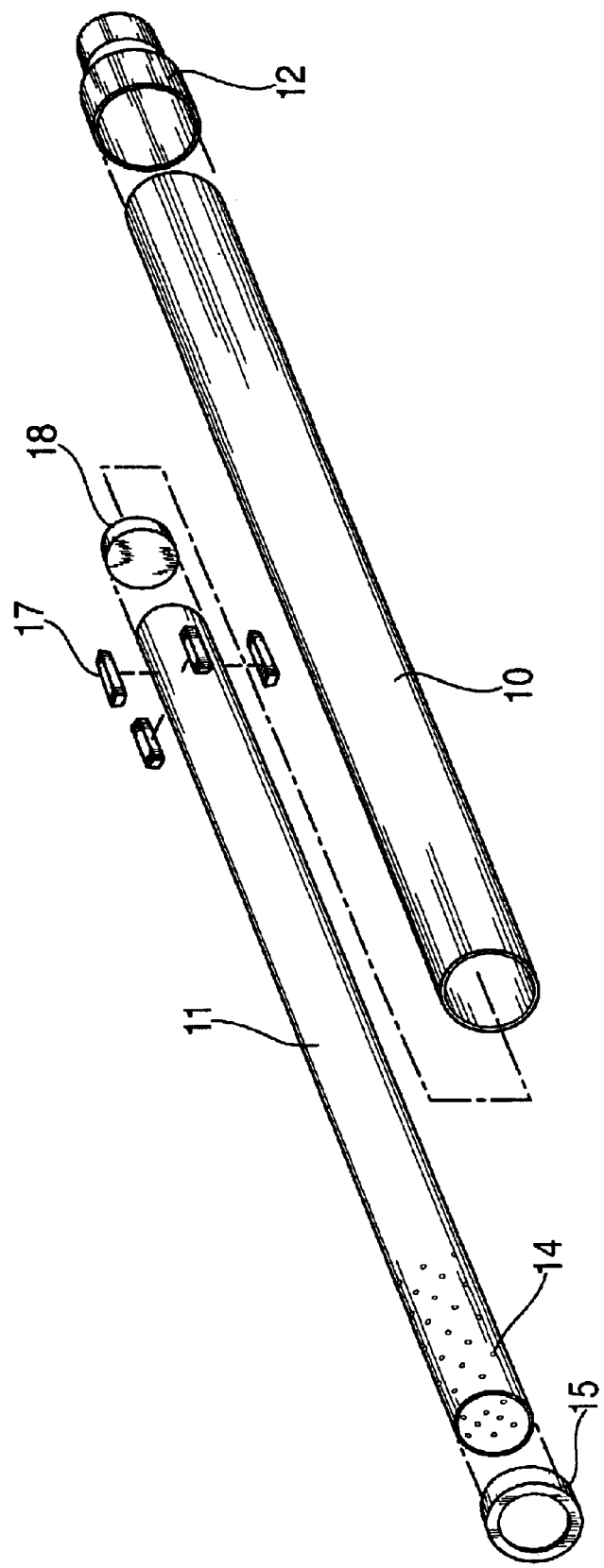
FIG. 2 is an exploded view of the device showing all of the elements of FIG. 1 and further showing spacers attached to one end of the inner tube and a rubber plug insertable into the inner tube.
Figure 3:
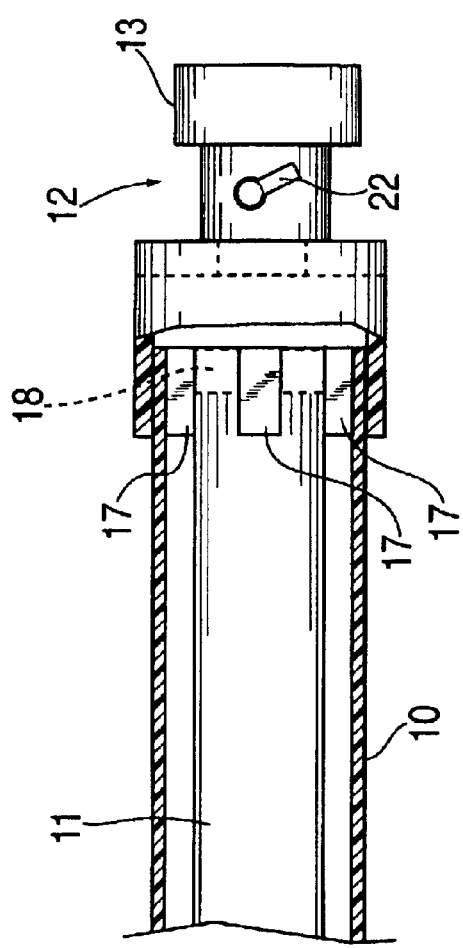
FIG. 3 is a cross-sectional view showing all of the elements of FIGS. 1 and 2 in an assembled condition.

FIG. 1 is a prospective view of the assembled device showing the outer tube 10 having an end cap fitted over the outer circumference of one end thereof and having a female hose connection. A bushing 15 is shown inserted into one end of outer tube 10 opposite the end having end cap 12. An inner tube 11 of smaller diameter than outer tube 10, is insertable into outer tube 10.

When inner tube 11 is inserted and in place in outer tube 10 it will abut and sit on lip 16 of bushing 15 which fits snugly into the opening of the outer tube opposite the end having the end cap with female hose connection.

A plurality of small apertures or holes 14 are placed circumferentially around the inner tube 11 for a purpose to be more fully described below.

A plurality of tube spacers 17 are disposed about the outer circumference of inner tube 11 near one end thereof opposite from the end having apertures 14. These spacers 17 separate the inner and outer tubes and keeps this one end in place with the other end being kept in place by lip 16 of bushing 15.

A rubber end plug 18 is inserted in the spacer end of inner tube 11. A water source 19, such as a standard garden hose, is connected to the lever type flow valve 13 controlled by on-off water flow lever 22.

Figure 4:
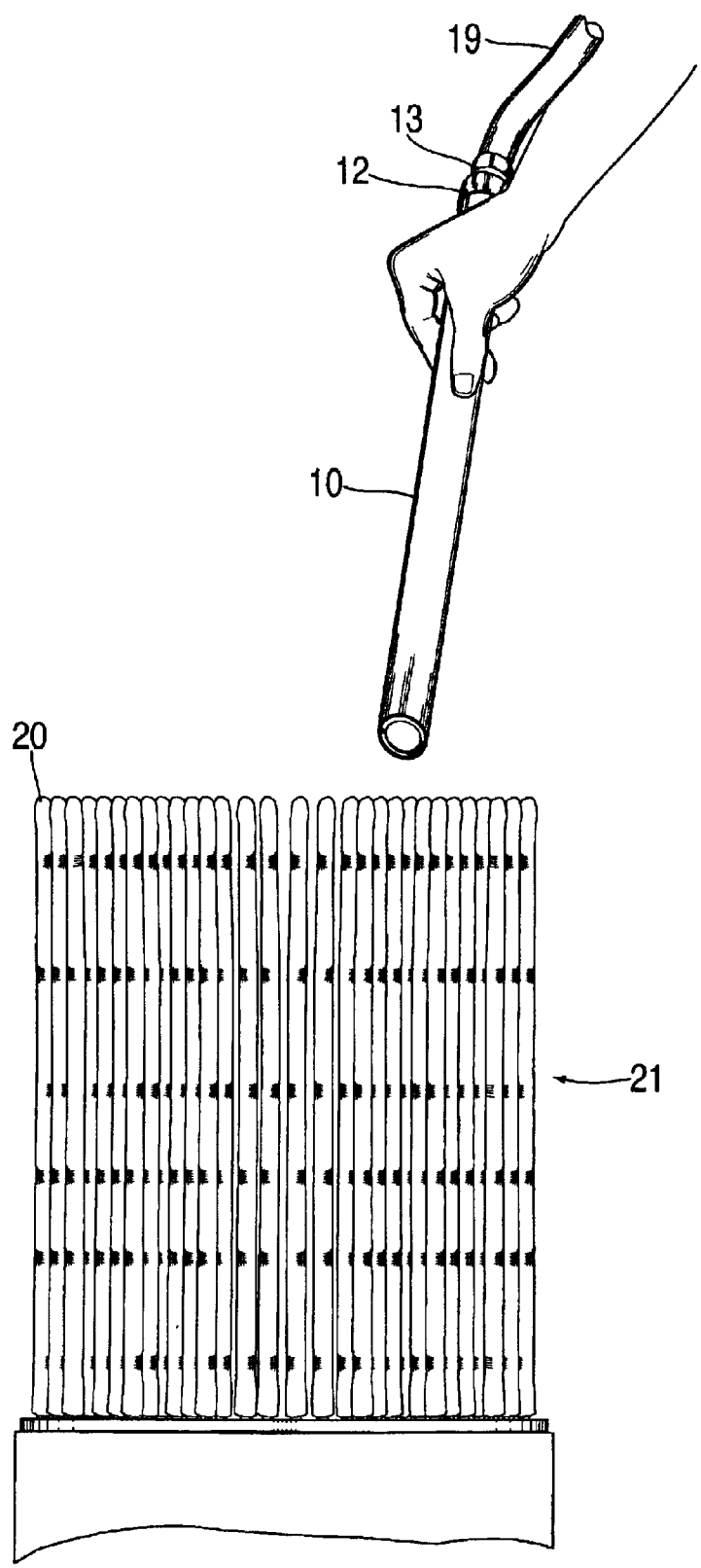
FIG. 4 shows the flexible tube nest with the flexible tubes facing upward and the device being held by a user and ready to be placed over one of the flexible tubes.
Figure 5:
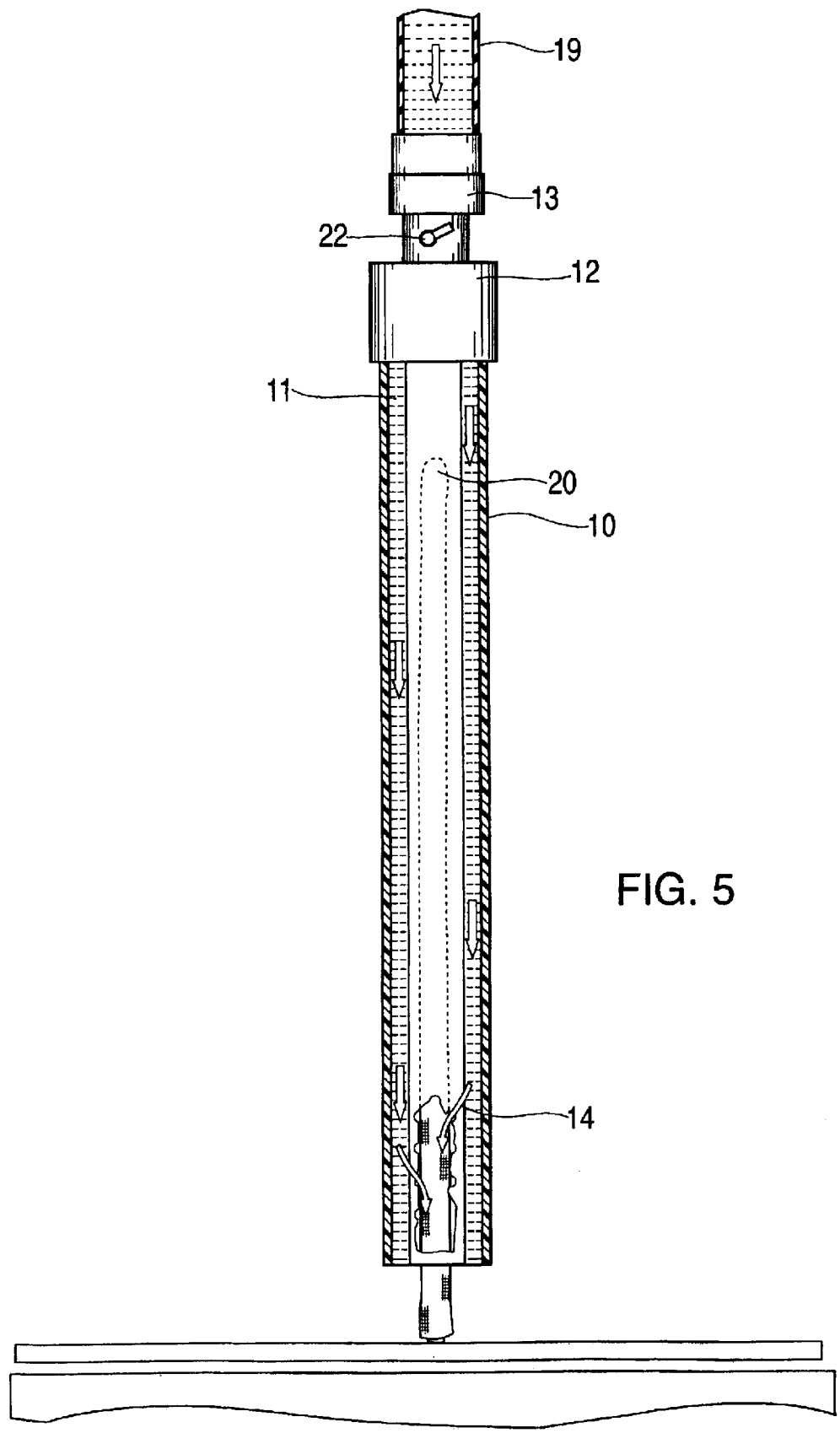
FIG. 5 is a vertical cross-section showing the invention in place over one flexible tube showing the direction of water flow from a water source, through the valve, downwardly between the tubes, and then through the small holes or openings or apertures at one end of the inner tube for impacting on the flexible tube.

Shown in FIG. 4 is a flexible tube nest 21 having individual flexible tubes 20 one of which is shown in position to be cleaned in FIG. 5.

To assemble the unit, rubber end plug 18 is inserted into one end of inner tube 11. The plurality of tube spacers 17 are disposed about the same end of inner tube 11. The tube is then inserted into outer tube 10 and bushing 15 with lip 16 is inserted into the opposite end of outer tube 10 with inner tube 11 abutting lip 16. Thus, between lip 16 and spacers 17, the inner tube is held in place spaced apart from outer tube 10.

The end cap with female hose connector 12 is then placed over the end of outer tube 10 distant from the end having bushing 15. Inserted into this end cap with female hose connector 12 is lever type flow valve 13.

In operation, the inner tube, in place in the outer tube, is inserted over one of the flexible tubes 20 and with on-off water flow lever 22 in the off position. The water source, such as a standard garden hose, is then attached to the flow valve 13, the water source is caused to flow, the on-off water flow lever is switched to the on position, and water will flow downwardly, as viewed in FIGS. 4 and 5, between the inner and outer tubes, and then through the small apertures or holes at the other end of inner tube 11 and then through to and impact upon flexible tube 20 while at the same time the user of the device is moving the device up and down throughout the length of the individual flexible tube 20 while at the same time imparting slight twisting motion.

After the individual tube is cleaned the other flexible tubes in the same flexible tube nest are cleaned in the same way.

The nest is then put back into the filter and the filter is then engaged with the pool.

Though the invention has been described and illustrated with reference to a preferred embodiment thereof, those skilled in the art will appreciate that various changes and modifications in shape, size, composition, and arrangement of parts may be resorted to without departing from the spirit of the invention or scope of the subjoined claims.

What is claimed:

1. A cleaning device for a swimming pool filter of the flexible tube nest type comprising:
   (a) an outer tube;
   (b) an inner tube disposed inside the outer tube and spaced apart therefrom;
   (c) a plurality of apertures extending through said inner tube and circumferentially surrounding said inner tube near one end thereof;
   (d) a water source connected to one end of said outer tube;
   (e) an on-off water flow lever for controlling the flow of water to the outer tube such that the water will flow between said outer and said inner tubes, through said apertures in said inner tube, and impacting one flexible tube of said flexible tube nest thereby cleaning said flexible tube when said flexible tube is inserted into said inner tube; and,
   (f) said inner and said outer tubes are further spaced apart by means of a bushing having a lip inserted into one end of said outer tube opposite the end connected to said water source whereby said inner tube fits into and cooperates with said lip of said bushing and thereby keeping said outer and said inner tubes spaced apart.

2. The cleaning device for a swimming pool filter as claimed in claim 1 wherein said inner and said outer tubes are spaced apart by means of a plurality of tube spacers attached around the circumference of said inner tube at one end thereof distant from the end having said apertures extending there through.

3. The cleaning device for a swimming pool filter as claimed in claim 2 wherein an end plug is inserted into one end of said inner tube opposite the end having the apertures such that the said water will not flow through said inner tube.

4. The cleaning device for a swimming pool filter as claimed in claim 3 wherein an end cap is disposed over the end of said outer tube opposite the end having said bushing having a lip and wherein said end cap has a female hose connection for receiving a flow valve having means for controlling the flow of said water from said water source wherein said means for controlling the flow of said water is said on-off water flow lever.

5. The cleaning device for a swimming pool filter as claimed in claim 4 wherein said water source is connected to one end of said outer tube by means of said flow valve.

* * * * *